UNITED STATES PATENT OFFICE.

ROBERT E. SCHMIDT, OF ELBERFELD, GERMANY, ASSIGNOR TO THE FARBENFABRIKEN OF ELBERFELD COMPANY, OF NEW YORK, N. Y.

BLUE CHRYSAZIN DYE AND PROCESS OF MAKING SAME.

SPECIFICATION forming part of Letters Patent No. 656,669, dated August 28, 1900.

Application filed August 15, 1899. Serial No. 727,253. (Specimens.)

*To all whom it may concern:*

Be it known that I, ROBERT E. SCHMIDT, doctor of philosophy, chemist, (assignor to the FARBENFABRIKEN OF ELBERFELD COMPANY, of New York,) residing at Elberfeld, Germany, have invented a new and useful Improvement in New Dyes Derived from Chrysazin; and I hereby declare the following to be a clear and exact description of my invention.

In the specification to Letters Patent No. 595,350, dated December 14, 1897, I have described the manufacture of a disulfonic acid of paradiamidochrysazin having the formula:

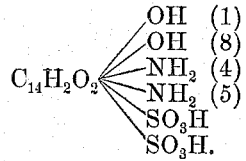

I have now found that a valuable new benzylated dyestuff can be obtained by subjecting the said disulfonic acid to the action of benzyl-chlorid.

In carrying out my new process practically I can proceed as follows, the parts being by weight: Into a solution prepared from ten parts of diamidochrysazindisulfonic acid and five hundred parts of hot water eight parts of benzyl-chlorid are introduced, with energetic stirring at from 80° to 90° centigrade. Subsequently the stirring of the reaction mixture is continued until, on testing, unchanged diamidochrysazindisulfonic acid is no longer found to be contained therein. The new dyestuff is then completely separated from the reaction mass by cooling and adding a sufficient quantity of a concentrated common-salt solution. Finally the coloring-matter is filtered off, dried, and pulverized. It is thus obtained in the shape of a blue powder soluble in water with a blue color, from which solution the dyestuff is precipitated by the addition of a strong hydrochloric acid.

The coloring-matter dissolves in a dilute soda-lye with a blue color. By concentrated sulfuric acid it is dissolved with a yellow color, which changes into reddish yellow on the addition of boric acid. It dyes unmordanted wool in acid baths pure-blue shades and yields on chrome-mordanted wool greenish-blue shades.

Having now described my invention, and in what manner the same is to be performed, what I claim as new, and desire to secure by Letters Patent, is—

1. The process for producing a new benzylated dyestuff from diamidochrysazindisulfonic acid, which process consists in first heating a mixture prepared from a watery solution of diamidochrysazindisulfonic acid and benzyl-chlorid, secondly precipitating the new dyestuff thus produced from the reaction mixture and finally isolating the same, substantially as hereinbefore described.

2. As a new article of manufacture the new benzylated chrysazin dyestuff, being when dry and pulverized a blue powder soluble in water with a blue color, from which solution the dyestuff is again precipitated by the addition of strong hydrochloric acid, soluble in a dilute soda-lye with a blue color, being dissolved by concentrated sulfuric acid with a yellow color which is changed into reddish yellow on the addition of boric acid, dyeing unmordanted wool in acid-baths pure-blue shades, yielding on chrome-mordanted wool greenish-blue shades, substantially as hereinbefore described.

In testimony whereof I have signed my name in the presence of two subscribing witnesses.

ROBERT E. SCHMIDT.

Witnesses:
 R. E. JAHN,
 OTTO KONÏG.